United States Patent [19]

Graves

[11] Patent Number: 5,674,971

[45] Date of Patent: Oct. 7, 1997

[54] UREA-FORMALDEHYDE RESIN COMPOSITION AND METHOD OF PREPARATION THEREOF

[75] Inventor: Larry R. Graves, Puyallup, Wash.

[73] Assignee: Georgia-Pacific Resins, Inc., Atlanta, Ga.

[21] Appl. No.: 468,144

[22] Filed: Jun. 6, 1995

[51] Int. Cl.$^6$ .............................. C08G 12/02; C08G 14/02
[52] U.S. Cl. ...................... 528/239; 528/232; 528/239; 528/256; 528/266; 524/714; 524/777; 428/221
[58] Field of Search ..................................... 528/232, 239, 528/256, 266; 524/714, 777; 428/221

[56] References Cited

U.S. PATENT DOCUMENTS

| | | | |
|---|---|---|---|
| 2,255,026 | 9/1941 | Keenen | 71/27 |
| 2,255,027 | 9/1941 | Keenen | 71/27 |
| 3,438,764 | 4/1969 | Church | 71/30 |
| 3,462,256 | 8/1969 | Justice et al. | 71/28 |
| 3,962,166 | 6/1976 | Gordon . | |
| 3,970,625 | 7/1976 | Moore et al. | 260/29.4 |
| 4,025,329 | 5/1977 | Goertz | 71/3 |
| 4,304,588 | 12/1981 | Moore | 71/28 |
| 4,554,005 | 11/1985 | Hawkins | 71/30 |
| 4,578,105 | 3/1986 | Moore | 71/28 |
| 4,599,102 | 7/1986 | Hawkins | 71/30 |
| 4,603,191 | 7/1986 | Kong | 528/259 |
| 4,610,715 | 9/1986 | Monaldi | 71/28 |
| 4,776,879 | 10/1988 | Hawkins et al. | 71/93 |
| 4,778,510 | 10/1988 | Hawkins | 71/30 |
| 4,968,773 | 11/1990 | Whiteside | 528/230 |
| 5,266,097 | 11/1993 | Moore | 71/28 |
| 5,362,842 | 11/1994 | Graves et al. | 528/262 |

FOREIGN PATENT DOCUMENTS

| | | |
|---|---|---|
| 26 23 607 | 2/1977 | Germany . |
| 48-060737 | 4/1973 | Japan . |
| 48-079241 | 10/1973 | Japan . |
| 1240763 | 6/1986 | U.S.S.R. . |

*Primary Examiner*—Samuel A. Acquah
*Attorney, Agent, or Firm*—Banner & Witcoff, Ltd.

[57] ABSTRACT

A urea-formaldehyde resin useful as a binder for making a variety of products, and a method for making the resin. The resin is prepared by reacting formaldehyde, urea, and ammonia in at least a two under alkaline conditions and optionally neutralizing the resin in a third step. The urea-formaldehyde resin thus produced has good resistance to hydrolysis, cures quickly, and is characterized by low formaldehyde emissions (release).

28 Claims, No Drawings

UREA-FORMALDEHYDE RESIN COMPOSITION AND METHOD OF PREPARATION THEREOF

BACKGROUND OF THE INVENTION

1. Field of the Invention

This invention relates to a urea-formaldehyde resin composition, to methods of manufacturing the resin and using it, and to products prepared using the resin. More particularly, the invention relates to a urea-formaldehyde resin composition which cures quickly and exhibits low formaldehyde emission. The resin is useful, for example, in a binder composition for making glass fiber mats, such as roofing shingles.

2. Description of Related Art

Often, products containing fibrous or particulate materials are manufactured by binding the materials together by use of a binder composition. Such compositions typically are known as "binders". Binders not only retain the fibrous or particulate materials in the desired orientation or shape, but also impart certain physical characteristics to the product. For example, mats of glass fibers bound together have a variety of forms and uses, such as support sheets for vinyl and other types of composite flooring, roofing shingles, or siding.

Preferred characteristics of binders used to bind glass fibers may be different from preferred characteristics of binders used to bind other particulates. For example, it may be desirable to use a binder that after setting is soluble in a preselected solvent so that the bound material is released into that solvent. It may be desirable to make the set or cured binder freely soluble in some solvent, affording quick release of the bound material, or to make the binder only sparingly soluble, thus delaying release of the material. Because the characteristics exhibited by the binder contribute to the overall characteristics of the product, the binder must be carefully selected.

Typical binders used to bind glass fiber mats include urea-formaldehyde resins, phenolic resins, melamine resins, bone glue, polyvinyl alcohols, and latexes. These binder materials are impregnated directly into the fibrous mat and set or cured by heating to provide the desired integrity for the glass fibers. The most widely used glass mat binder is ureaformaldehyde because it is relatively inexpensive.

Glass fibers also have been used by themselves and in combination with other types of fibers in the production of paper-like sheet materials. Glass fibers have been used as a supplemental fiber in specialty, synthetic, fiberboard, pulp, and composite papers, and are finding a use in glass fiber paper, a substitute for papers made of asbestos fiber. Also, there has been and continues to be increasing use of a nonwoven, sheet-like mat of glass fibers (particularly chopped glass fibers or strands, and combinations thereof) as a replacement for organic felts such as cellulose mats in roofing shingles and buildup roofing systems (BUR systems).

Use of the glass fiber mats in the roofing industry provides several advantages. These advantages include: reduction in the amount of asphalt necessary for the roofing products, reduction in the weight of the roofing products, increased production rates for producing roofing products, superior rot resistance, longer product life, and improved fire ratings. These nonwoven, sheet-like mats usually are produced in a process in which glass fibers (chopped fibers, chopped fiber strands, strands, and combinations thereof) are dispersed in an aqueous medium and the resulting slurry is formed into a mat. The nonwoven, sheet-like mat product is fixed in form by contacting the mat of glass fibers with a resinic binder. An example of such a process is the "wet-laid process". Descriptions of the wet-laid process may be found in a number of U.S. patents, including U.S. Pat. Nos. 2,906,660, 3,012,929, 3,050,427, 3,103,461, 3,228,825, 3,760,458, 3,766,003, 3,838,995 and 3,905,067, all of the teachings of which are incorporated herein by reference.

The wet-laid process involves forming, usually with agitation in a mixing tank, an aqueous slurry of glass fibers, typically chopped fibers or chopped strands of suitable length and diameter. Other forms of glass fibers, such as continuous strands, also may be used. Generally, fibers having a length of about ¼ inch to 3 inches and a diameter of about 3 to 20 microns are used. Each bundle may contain from about 20 to 300, or more, of such fibers, which may be sized or unsized, wet or dry, as long as they can be suitably dispersed in an aqueous dispersant-containing medium. The bundles are added to the medium to form an aqueous slurry. Any suitable dispersant known in the art, e.g., polyacrylamide, hydroxyethyl cellulose, ethoxylated amines, and amine oxides, may be used. The dispersant is employed in relatively small amounts, e.g. 0.2–10 parts in 10,000 parts of water.

The fiber slurry is agitated to form a workable, well-dispersed slurry having a suitable consistency. The aqueous slurry, often referred to as slush, is processed into the wet-laid, nonwoven, sheet-like mat by such machines as cylinder or Fourdrinier machines. More technologically-advanced machinery, such as the StevensFormer, RotoFormer, InverFormer, DeltaFormer, and the Verti-Former machines, also are used. The slush is deposited in some manner from a head box onto a moving wire screen or onto the surface of a moving wire-covered cylinder. On route to the screen, the dispersion usually is diluted with water to a lower fiber concentration. The slurry on the screen or cylinder is processed into the sheet-like mat by the removal of water, usually by suction and/or vacuum devices, followed by the application of a polymeric binder. Binder composition is applied by soaking the mat in an excess of binder solution, or by impregnating the mat surface by means of a binder applicator, for example, by roller or spray. The primary binder applicator for glass mat machines is the falling film curtain coater. Suction devices often are utilized for further removal of water and excess binder and to ensure a thorough application of binder through the glass mat.

Thus-incorporated binder is thermally cured, typically in an oven at elevated temperatures. Generally, a temperature of at least about 200° C. is used during curing. Normally, this heat treatment alone will effect curing. Catalytic curing, such as is accomplished with an acid catalyst (for example, ammonium chloride or p-toluene sulfonic acid), generally is a less desirable, though an optional, alternative.

Typically, when urea-formaldehyde resins are used as a binder component they release formaldehyde into the environment during cure. Formaldehyde also can be released subsequently from the cured resin, particularly when the cured resin is exposed to acidic environments. Such formaldehyde release is undesirable, particularly in enclosed environments. In such environments, formaldehyde is inhaled by workers and comes into contact with the eyes, the mouth, and other parts of the body. Formaldehyde is malodorous and is thought to contribute to human and animal illness.

Various techniques have been used to reduce formaldehyde emission from urea-formaldehyde resins. Use of formaldehyde scavengers and various methods for resin formulation, including addition of urea as a reactant late in the resin formation reaction, are techniques often used to reduce formaldehyde emission. However, use of formaldehyde scavengers often is undesirable, not only because of the additional cost, but also because it affects the characteristics, or properties, of the resin. For example, using ammonia as a formaldehyde scavenger often reduces the resistance of the cured resin to hydrolysis (degradation). Later addition of urea to reduce free formaldehyde concentration in the resin generally yields a resin that must be cured at a relatively low rate to avoid smoking. Resin stability also can be adversely effected by such treatments.

U.S. Pat. No. 2,260,033 describes a method which purportedly reduces the amount of free formaldehyde in a urea-formaldehyde resin. In the disclosed process, triethanolamine is added to a mixture of urea and formaldehyde having a 1:1 to 1.5:1 formaldehyde to urea mole ratio in an amount sufficient to neutralize its pH. The mixture is then reacted at 30° C. The resin is used to make molded objects, laminated material and films.

U.S. Pat. No. 2,626,251 describes the preparation of a water soluble, cationic urea-formaldehyde resin. The resin is disclosed as having a high degree of water resistance when cured and is suggested for use in textile applications and for adding wet strength to paper. The preferred resin is prepared by initially reacting urea and formaldehyde at a formaldehyde to urea mole ratio of at least 2.0 but less than 3.0 together with triethanolamine in a urea to triethanolamine mole ratio of 2.0 to not more than 3.0. The resin thus-formed then is made cationic by acidifying it to a pH below 2.5, and preferably at least 1.5, with a strong inorganic acid such as hydrochloric, sulfuric or nitric acid, followed by prompt neutralization to a pH of 6 to 7. A pH above 7 is discouraged as this purportedly retards the cure of the resin.

U.S. Pat. No. 3,882,462 to Pearson, describes a urea-formaldehyde resin prepared by reacting sequentially aqueous formaldehyde, a catalyzing acid, triethanolamine and urea. The aqueous resin is taught for use in coatings, adhesives and textile finishes. The preferred resin is prepared using 30 moles of formaldehyde, 2 moles of acid, preferably phosphoric acid, 2 moles of triethanolamine and 12 moles of urea. The various reactants are said to react, without applied heat, as rapidly as the materials are mixed together. In U.S. Pat. No. 4,119,598, said to be an improvement on the '462 patent, the formaldehyde, urea and triethanolamine are mixed before addition of the acid and the molar quantities, based on about 30 moles of formaldehyde, are changed to 0.13 mole acid, 1.6 mole triethanolamine and 9.9 moles urea. In yet another improvement patent, U.S. Pat. No. 4,370,442, melamine is included in the reaction mix to expand the resin's water dilutability and storage stability. Finally, in U.S. Pat. No. 4,663,239, Pearson describes including ammonium hydroxide, ammonium chloride and ammonium formate in the composition to reduce formaldehyde emissions.

U.S. Pat. No. 4,492,699 describes a urea-formaldehyde resin adhesive for wood composites, such as particle board, purportedly characterized by slow formaldehyde emission. The patent indicates that by increasing the level of methylene linkages in the resin, instead of dimethylene ether linkages and methylol end groups, hydrolytic degradation, which contributes to increased formaldehyde emission, is reduced. To accomplish this goal, the resin is prepared in a process having two stages of condensation and two stages of methylolation. In a first condensation stage, urea is added to a highly acidic formaldehyde solution (pH of 0.5 to 2.5) at a formaldehyde to urea mole ratio of 2.5 to 4.0. The initial stage is very exothermic and proceeds without the application of heat. The reaction can be controlled to a temperature in the range of 50° C. to 99° C. by adding the urea incrementally. Thereafter, the resin solution is neutralized and additional urea is added. Triethanolamine is one of several bases mentioned for neutralizing the resin and a combination of sodium hydroxide and triethanolamine is preferred. After the second stage, the cumulative formaldehyde to urea mole ratio is within the range of 1.5:1.0 to 2.5:1.0. The second step is conducted at a temperature of 50° C. to 80° C. to permit methylolation to proceed slowly. The resin then is switched again to an acidic pH, heated to reflux and reacted to a desired viscosity. Finally, the resin is neutralized to slight alkalinity (pH of 7.3–7.5) and additional urea is added to provide a cumulative formaldehyde to urea mole ratio of 1.1:1.0 to 2.3:1.0. Methylolation is said to proceed thereafter during storage. Finally, the resin can be cured later to an infusible state during use by adding ammonium chloride and heating at 115° C. for 15 minutes.

U.S. Pat. No. 4,968,773 describes preparing a urea-formaldehyde resin purportedly having a low extractable formaldehyde content by first methylolating urea under alkaline conditions (pH of 6–11) at a formaldehyde to urea mole ratio within the range of 2:1 to 3:1, followed by condensation at a low (highly acidic) pH (pH of 0.5–3.5), then neutralizing the resin (PH of 6.5–9) and adding additional urea to yield a final formaldehyde to urea mole ratio of 1.8:1 or less.

U.S. Pat. 5,362,842 describes the preparation of a U/F resin suitable for use in a glass binder composition. The resin is prepared by initially reacting, at an alkaline pH (preferably 8 to 8.4) and at an elevated temperature (preferably 95° C.), a mixture of urea, formaldehyde and triethanolamine (TEA), optionally containing ammonia, to methylolate the urea. The reaction typically takes less than 30 minutes, and as it progresses the pH falls to about 6.8 and 7.3. The initial F/U mole ratio is broadly between 1.5 and 4 (preferably 2.75 to 4.0), the TEA/U mole ratio is between 0.001 and 0.1 and the preferred $NH_3/U$ mole ratio is 0 to 0.5. The mixture then is acidified, generally to a pH of about 5 (i.e., 4.9 to 5.2), additional urea is added, generally in several doses, to reduce the F/U mole ratio to within the range of from 1.5 to 2.5 and the reaction is continued for 1.5 to 2 hours. Finally, the resin is neutralized.

SUMMARY OF THE INVENTION

The present invention is based on the discovery of a urea-formaldehyde resin and of a method for making the resin. The resin is prepared by reacting urea and formaldehyde in at least a two step and optionally a three-step process. In the first step, conducted under alkaline reaction conditions, urea and formaldehyde are reacted in the presence of ammonia, at an F/U mole ratio of between about 1.2:1 and 1.8:1. The ammonia is supplied in an amount sufficient to yield an ammonia/urea mole ratio of between about 0.05:1 and 1.2: 1. The mixture is reacted to form a cyclic triazone/triazine polymer which forms the building block for the ultimate resin.

Thereafter, a thermosetting resin is formed from the triazole/triazine resin building block by adding additional formaldehyde to yield a higher cumulative F/U mole ratio of between about 1.5:1 and 3.0:1. The pH is adjusted low enough to control the rate of condensation and the reaction is continued under this mildly acidic condition (second step). During this reaction, the pH is lowered to about 4.3 to 4.9 and the resin viscosity advances. Once the desired viscosity endpoint is reached, the reaction mixture is cooled and the resin is used promptly or the resin is neutralized (third step) with, for example, sodium hydroxide to enhance its storage stability for later use and/or distribution.

DETAILED DESCRIPTION OF THE INVENTION

The invention is based on the discovery that a prepolymer formed by a first step reaction of formaldehyde, urea, and ammonia can be converted to a crosslinked polymer matrix that exhibits improved control of formaldehyde emissions and a faster rate of cure than similar polymers made using conventional methods. The polymer is prepared by reacting urea and formaldehyde in at least a two step and optionally a three-step process.

In the first step, a cyclic triazone/triazine polymer is formed. Urea and formaldehyde are mixed in the presence of ammonia under an alkaline reaction condition, at an F/U mole ratio of between about 1.2:1 and 1.8:1. The ammonia is supplied in an amount sufficient to yield an ammonia:urea mole ratio of between about 0.05:1 and 1.2:1, preferably between about 0.2:1 and 0.8:1. The alkalinity of the reaction mixture is maintained at a pH of about 8.0 to 10.0, preferably about 8.7 to 9.3. The alkalinity can be maintained by adding an alkali metal hydroxide such as sodium, lithium or potassium hydroxide, preferably sodium hydroxide, or other compounds such as alkali metal carbonates, alkaline earth hydroxides, organic amines.

The mixture is heated quickly to a temperature of about 85° to 105° C., preferably about 95° C., and the mixture is maintained at that temperature for a time sufficient for the reaction to form the cyclic triazone/triazine polymer. The amount of a time sufficient for the reaction to proceed to the desired extent varies depending on the particular reaction conditions, but is usually about 45 to 135 minutes, and particularly about 90 minutes.

In the second step, a thermosetting polymer is formed from the cyclic polymer. The reaction mixture containing triazole/triazine polymer formed in step one is cooled to a temperature of between about 60° to 90° C., preferably about 85° C., and then additional formaldehyde is added, preferably with additional urea, to yield a higher cumulative F/U mole ratio of between about 1.5:1 to 3.0:1, preferably between about 1.9:1 and 2.7:1. A sufficient amount of mild acid is also added to adjust the pH to a value low enough to permit good control of the rate of condensation with a preferred pH being about 6.0 to 6.4. Mild acids include a dilute mineral acid, an organic acid or an acid salt, such as ammonium chloride, ammonium sulfate, etc., or alum that is diluted to a controlled concentration and can be added for pH adjustment before or after the formaldehyde. The reaction is then continued under this mildly acidic condition at a temperature of between about 70° to 105° C., preferably about 85° C. for a time sufficient to form the thermosetting polymer. A typical, but not limiting, reaction time is about 10 to 90 minutes, most often about 45 minutes, to ensure proper advancement of polymer condensation reaction.

The polymer then is cooled to an appropriate temperature, for example, to a temperature of about 80° C. The polymer may be cooled in stages, for example, the polymer may be cooled first to about 80° C. over about 15 minutes and then to about 75° C. The cooling time and temperature may be varied and selection of particular conditions is within the skill of the art by routine testing. As the polymer cools, the pit falls to about 4.3 to 4.9, preferably about 4.5, and the viscosity of the polymer increases. Once the desired viscosity is reached, for example, 100 to 225 centipoise, the resin is cooled to room temperature. The resin can be used promptly or is further treated and stored.

If the resin is not used immediately, a third neutralization step should be employed. In this step, the resin is neutralized with, for example, an alkali metal hydroxide such as sodium, lithium, or potassium hydroxide, preferably sodium hydroxide, to enhance its storage stability. Other neutralizing agents include alkali metal carbonates, alkaline earth hydroxides and organic amines.

Skilled practitioners recognize that the reactants are commercially available in many forms. Any form which can react with the other reactants and which does not introduce extraneous moieties deleterious to the desired reaction and reaction product can be used in the preparation of the urea-formaldehyde resin of the invention.

Formaldehyde is available in many forms. Paraform (solid, polymerized formaldehyde) and formalin solutions (aqueous solutions of formaldehyde, sometimes with methanol, in 37 percent, 44 percent, or 50 percent formaldehyde concentrations) are commonly used forms. Formaldehyde also is available as a gas. Any of these forms is suitable for use in the practice of the invention. Typically, formalin solutions are preferred as the formaldehyde source.

Similarly, urea is available in many forms. Solid urea, such as prill, and urea solutions, typically aqueous solutions, are commonly available. Further, urea may be combined with another moiety, most typically formaldehyde and urea-formaldehyde, often in aqueous solution. Any form of urea or urea in combination with formaldehyde is suitable for use in the practice of the invention. Both urea prill and combined urea-formaldehyde products are preferred, such as Urea Formaldehyde Concentrate or UFC 85. These types of products are disclosed in, for example, U.S. Pat. No. 5,362,842 and 5,389,716.

Skilled practitioners also recognize that ammonia is available in various gaseous and liquid forms, particularly including aqueous solutions at various concentrations. Any of these forms is suitable for use. However, commercially-available aqueous ammonia-containing solutions are preferred herein. Such solutions typically contain between about 10 and 35 percent ammonia. A solution having 35% ammonia can be used providing stability and control problems can be overcome. An aqueous solution containing about 28 percent ammonia is particularly preferred. Anhydrous ammonia may also be used.

Use of ammonia and/or late additions of urea are commonly used prior art techniques to reduce free formaldehyde levels in urea-formaldehyde polymer systems. The former technique suffers from reducing the cured polymers resistance to hydrolysis. The latter technique suffers from a tendency to produce a polymer system that releases smoke during the cure cycle. This invention reduces or eliminates both of these problems, yet still significantly reduces free formaldehyde levels during cure and in the cured product.

The reactants may also include a small amount of a resin modifier such as ethylenediamine (EDA). Additional modifiers, such as melamine, ethylene ureas, and primary, secondary and triamines, for example, dicyanodiamide can also be incorporated into the resin of the invention. Concentrations of these modifiers in the reaction mixture may vary from 0.05 to 5.00%. These types of modifiers promote hydrolysis resistance, polymer flexibility and lower formaldehyde emissions.

Further urea additions for purposes of scavenging formaldehyde or as a diluent also may be used although should not normally be needed.

The resin of the invention also is advantageously used in the preparation of glass fiber mats to be used, for example, in the manufacture of roofing shingles. For example, glass fibers are slurried into an aqueous dispersant medium. The glass slurry is then dewatered on a perforated surface to form a mat. The binder resin of the invention is then applied to the mat before the mat passes through a drying oven where the mat is dried and the incorporated binder resin is cured. Glass fiber mats so-produced with the resin of this invention exhibit low formaldehyde emission and exhibit good dry and hot wet tensile strength, as well as good tear strength. For instance, 20–25% increases in hot wet tensile strength and 25–30% increases in tear strength have been observed relative to a control without the cyclic prepolymer.

The following examples are for purposes of illustration and are not intended to limit the scope of the claimed invention.

EXAMPLES

Example 1

The following reactants were used to prepare a urea-formaldehyde resin.

| Reactant | moles |
| --- | --- |
| formalin solution, 50% $CH_2O$ | 14.5 |
| EDA | 0.3 |
| Urea (first charge) | 12.1 |
| $NH_4OH$, 28% | 6.1 |
| UFC 85: | |
| water | 14.4 |
| HCHO | 34.5 |
| UREA | 7.2 |
| Urea (second charge) | 3.5 |
| Alum 50% | 0.2 |
| NaOH 25% | 0.02 |
| latent catalyst | 0.02 |
| Water | 1.6 |

A resin was prepared by charging the 50% formalin, EDA (ethylenediamine) and urea into a reactor and heating the mixture to 45° C. to dissolve the urea. Then $NH_4OH$ was added which caused the mixture to exotherm to a temperature of 83° C. The reaction mixture was then heated further to 95° C. and maintained at that temperature for 90 minutes. A cyclic polymer was formed in this initial phase of the chemical reaction. (The triazone concentration can be over 50% of the total polymer mix at this time of the synthesis depending on the molar ratios of the ingredients.) The pH of the mixture was monitored and maintained between 8.7 and 9.3 by adding 25% NaOH as needed at spaced intervals. A total of 0.4 moles were added. The reaction mixture then was cooled to 85° C. UFC 85 (25% urea, 60% formaldehyde and 15% water) and a second charge of urea then were added to the reaction mixture. The temperature was thereafter maintained at 85° C. for 10 minutes. The pH was adjusted to from about 6.2 to 6.4 by adding a total of 0.2 mole of alum in increments over a course of 25 minutes. The reaction mixture was cooled to 80° C., and after 15 minutes, further cooled to 75° C. After 7 minutes, the reaction mixture was cooled to 55° C., 26.9 g 25% NaOH was added, and then the mixture was further cooled to 35° C. A latent catalyst was added and the reaction mixture was cooled to 25° C. The pH was finally adjusted to 7.6 to 8.2 with 25% NaOH.

The fresh free formaldehyde level of the so-produced resin was 0.59%. After 24 hours the free formaldehyde level had dropped to 0.15%. The resin's viscosity was 573 cp.

Example 2

About 1.2 moles formaldehyde (50% solution), about 1.0 moles urea, and about 0.5 moles ammonia as 28% ammonium hydroxide were added to a glass reactor and heated to 95° C. The pH was maintained at 8.3 to 8.6 for 90 minutes with 25% sodium hydroxide. Then about 2.4 moles of formaldehyde and about 0.9 moles of urea were added as UFC 85 and urea. The pH of the solution was adjusted to 4.9 to 5.1 with 50% aluminum sulfate and reacted to a Gardner-Holdt viscosity of "K". The polymer solution was then neutralized to pH 7.4 with 25% sodium hydroxide and cooled to 25° C. The final Brookfield viscosity was 200 cps with a free formaldehyde level of about 0.5%.

Example 3

About 1.2 moles formaldehyde (50% solution), about 0.0003 moles triethanolamine, about 1.0 moles urea, and about 0.5 moles ammonia as 28% ammonium hydroxide were added to a glass reactor and heated to 95° C. The pH was maintained at 8.3 to 9.1 for 90 minutes with 25% sodium hydroxide. Then about 2.4 moles of formaldehyde and about 0.9 moles of urea were added as UFC 85 and urea. The temperature was adjusted to 90° C. and the pH of the solution was adjusted to 5.1 to 5.3 with 50% aluminum sulfate and reacted to a Gardner-Holdt viscosity of "K". The polymer solution was then adjusted to a pH of 6.8 with 25% sodium hydroxide and cooled to 25 ° C. The final Brookfield viscosity was 245 cps with a free formaldehyde level of about 0.7%.

I claim:

1. A method of preparing a urea-formaldehyde resin comprising mixing formaldehyde (F), urea (U), and ammonia and heating the mixture at an alkaline pH to an elevated temperature for a time sufficient to form a cyclic triazone/triazine polymer, the reactants being present in amounts to provide an initial F/U mole ratio between about 1.2:1 and 1.8:1 and an ammonia to urea mole ratio between about 0.05:1 and 1.2:1;

adding additional formaldehyde to the mixture to yield a cumulative F/U mole ratio of between about 1.5:1 and 3.0:1, adding an acid to lower the pH, and reacting for a time sufficient produce the urea-formaldehyde resin.

2. The method of claim 1 wherein the ammonia to urea mole ratio between about 0.2:1 and 0.8:1.

3. The method of claim 1 wherein the cumulative F/U mole ratio is between about 1.9:1 and 2.7:1.

4. The method of claim 1 wherein the alkaline pH is between about 8.0 and 10.0.

5. The method of claim 1 wherein the pH is lowered to between about 6.2 and 6.4 by addition of the acid.

6. The method of claim 1 further comprising cooling the resin and allowing the pH to fall to about 4.3 to 4.9 while the viscosity of the resin is advanced.

7. The method of claim 1 further comprising neutralizing the resin.

8. The method of claim 7 wherein the resin is neutralized with an alkali metal hydroxide.

9. The method of claim 8 wherein the alkali metal hydroxide is sodium hydroxide.

10. The method of claim 1 wherein the mixture of formaldehyde, urea, and ammonia is heated to a temperature of between about 60° to 105° C.

11. The method of claim 1 wherein the acid is alum.

12. The method of claim 1 wherein urea is added following addition of the acid.

13. The method of claim 1 wherein the formaldehyde, urea, and ammonia are heated at a pH of about 8.0 to 10.0.

14. The method of claim 1 wherein the formaldehyde, urea and ammonia are heated at pH of about 8.7 to 9.3.

15. A urea-formaldehyde resin prepared by a method comprising:

mixing formaldehyde (F), urea (U), and ammonia and heating the mixture at an alkaline pH to an elevated temperature for a time sufficient to form a cyclic triazone/triazine polymer, the reactants being present in amounts to provide an initial F/U mole ratio of between about 1.2:1 and 1.8:1 and an ammonia to urea mole ratio of between about 0.05:1 and 1.2:1;

adding additional formaldehyde to yield a cumulative F/U mole ratio of between about 1.5:1 and 3.0:1, adding an acid to lower the pH, and reacting for a time sufficient produce the urea-formaldehyde resin.

16. The resin of claim 15 wherein the ammonia to urea mole ratio between about 0.2:1 and 0.8:1.

17. The resin of claim 15 wherein the cumulative F/U mole ratio is between about 1.9:1 and 2.7:1.

18. The method of claim 15 wherein the alkaline pH is between about 8.0 and 10.0.

19. The resin of claim 15 wherein the pH is lowered to between about 6.2 and 6.4 by adding the acid.

20. The resin of claim 15 further comprising cooling the resin and allowing the pH to fall to about 4.3 to 4.9 while the viscosity of the resin is advanced.

21. The resin of claim 15 further comprising neutralizing the resin.

22. The resin of claim 21 wherein the resin is neutralized with an alkali metal hydroxide.

23. The resin of claim 22 wherein the alkali metal hydroxide is sodium hydroxide.

24. The resin of claim 15 wherein the mixture of formaldehyde, urea, and ammonia is heated to a temperature of between about 60° to 105° C.

25. The resin of claim 15 wherein the acid is alum.

26. The resin of claim 15 wherein urea is added following addition of the acid.

27. The resin of claim 15 wherein the formaldehyde, urea, and ammonia are heated at a pH of about 8.0 to 10.0.

28. The resin of claim 15 wherein the formaldehyde, urea and ammonia are heated at a pH of about 8.7 to 9.3.

* * * * *